United States Patent
Yamanaka et al.

(10) Patent No.: US 9,981,663 B2
(45) Date of Patent: May 29, 2018

(54) CONTROL DEVICE FOR VEHICLE

(71) Applicant: TOYOTA JIDOSHA KABUSHIKI KAISHA, Toyota-shi, Aichi (JP)

(72) Inventors: Satoshi Yamanaka, Susono (JP); Takahiro Yokokawa, Susono (JP); Yoshio Ito, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 7 days.

(21) Appl. No.: 15/022,070

(22) PCT Filed: Sep. 2, 2014

(86) PCT No.: PCT/JP2014/073047
§ 371 (c)(1),
(2) Date: Mar. 15, 2016

(87) PCT Pub. No.: WO2015/041044
PCT Pub. Date: Mar. 26, 2015

(65) Prior Publication Data
US 2016/0221580 A1    Aug. 4, 2016

(30) Foreign Application Priority Data
Sep. 20, 2013   (JP) ................................ 2013-195946

(51) Int. Cl.
*B60W 30/18*     (2012.01)
*F16D 48/02*     (2006.01)
(Continued)

(52) U.S. Cl.
CPC ...... *B60W 30/18072* (2013.01); *B60W 10/02* (2013.01); *B60W 10/04* (2013.01);
(Continued)

(58) Field of Classification Search
None
See application file for complete search history.

(56) References Cited

U.S. PATENT DOCUMENTS 7,975,791 B2    7/2011   Nozaki et al.
8,579,764 B2    11/2013  Morita et al.
(Continued)

FOREIGN PATENT DOCUMENTS

JP    2007-131071 A    5/2007
JP    2012-072740 A    4/2012
(Continued)

*Primary Examiner* — Justin Holmes
*Assistant Examiner* — Timothy Hannon
(74) *Attorney, Agent, or Firm* — Hunton Andrews Kurth LLP (57) ABSTRACT

A control device for a vehicle includes: a coasting control unit configured to, during normal traveling at a low speed within a predetermined range, cause a vehicle to travel through inertia by blocking power transmission between an engine and driving wheels by disengaging a power transmitting/blocking device that includes a first engaging portion connected to the engine and a second engaging portion connected to the driving wheels, and by stopping the engine; and a return control unit configured not to full-engage the power transmitting/blocking device while the engine is cranking by a motor in a case of returning from coasting traveling to normal traveling and to full-engage the power transmitting/blocking device after the motor stops.

4 Claims, 7 Drawing Sheets

(51) Int. Cl.
    F02D 29/02      (2006.01)
    F02N 11/08      (2006.01)
    B60W 10/02      (2006.01)
    B60W 10/04      (2006.01)
    B60W 10/06      (2006.01)
    F02D 17/00      (2006.01)
    F16D 48/06      (2006.01)

(52) U.S. Cl.
    CPC ............ B60W 10/06 (2013.01); F02D 17/00 (2013.01); F02D 29/02 (2013.01); F16D 48/02 (2013.01); F16D 48/06 (2013.01); *B60W 2030/1809* (2013.01); *B60W 2520/10* (2013.01); *B60W 2710/021* (2013.01); *B60W 2710/06* (2013.01); *F02N 11/0818* (2013.01); *F02N 11/0848* (2013.01); *F16D 2048/0224* (2013.01); *F16D 2048/0293* (2013.01); *F16D 2500/5085* (2013.01); *F16D 2500/7041* (2013.01); *F16D 2500/70452* (2013.01); *Y02T 10/76* (2013.01)

(56) References Cited

U.S. PATENT DOCUMENTS

2004/0176213 A1* 9/2004 Benz .................. F16D 48/06
                                                477/166
2009/0156355 A1* 6/2009 Oh ..................... B60K 6/48
                                                477/5

FOREIGN PATENT DOCUMENTS

| JP | 2012-076474 A | 4/2012 |
| JP | 2012-086653 A | 5/2012 |
| JP | 2012-122497 A | 6/2012 |
| JP | 2012-144184 A | 8/2012 |

* cited by examiner

CONTROL DEVICE FOR VEHICLE

CROSS-REFERENCE TO RELATED APPLICATIONS

This is a national phase application based on the PCT International Patent Application No. PCT/JP2014/073047 filed Sep. 2, 2014, claiming priority to Japanese Patent Application No. 2013-195946 filed Sep. 20, 2013, the entire contents of both of which are incorporated herein by reference.

FIELD

The present invention relates to a control device for a vehicle that controls driving force during traveling.

BACKGROUND

Conventionally, coasting traveling of a vehicle, which is to travel through inertia by blocking, during traveling, the power transmission between an engine and driving wheels, is known as a technique for reducing the fuel consumption amount during traveling. A control device shifts the vehicle to coasting traveling by blocking the power transmission between the engine and the driving wheels by disengaging, during normal traveling, a clutch in an engaged state disposed therebetween. Here, deceleration stop & start traveling (hereinafter referred to as "deceleration S&S traveling") is known as the coasting traveling. The deceleration S&S traveling is coasting traveling caused by blocking the power transmission between the engine and the driving wheels by disengaging the clutch, and also by stopping the engine when the brake operation has been performed under a predetermined condition during normal traveling. In the case of returning from the deceleration S&S traveling to normal traveling, the control device restarts the engine in a stopped state, and engages the clutch in a disengaged state. For example, Patent Literature 1 described below discloses a technique relating to the deceleration S&S traveling.

CITATION LIST

Patent Literature

Patent Literature 1: Japanese Laid-open Patent Publication No. 2012-144184
Patent Literature 2: Japanese Laid-open Patent Publication No. 2012-122497

SUMMARY

Technical Problem

During deceleration S&S traveling, the rotation speed of an engaging portion on the engine side of the clutch is lower than the rotation speed of an engaging portion on the driving wheel side of the clutch. Therefore, in the case of returning from the deceleration S&S traveling in the above-described state to normal traveling, the rotation of the engine is raised by the starter motor, and the rotations of respective engaging portions of the clutch are synchronized. However, deceleration S&S traveling is executed when the vehicle is at low speed; therefore, there is a possibility that the clutch synchronizes before the complete explosion of the engine when returning to normal traveling. In a case where the clutch is full-engaged in accordance with such synchronization, the engine completely explodes thereafter, and the torque of the engine generated by such complete explosion is input to the full-engaged clutch. Therefore, the shock occurs on the power transmission path, and there is a possibility that such shock may be transmitted to the vehicle. Patent Literature 2 described above discloses a technique of full-engaging the clutch after the blow-up of the rotation at the time of starting the engine has been reduced in the case of restarting the engine and engaging the clutch while the vehicle is traveling freely, as coasting traveling, or while the vehicle is in a stopped state. However, in the case of returning from free traveling to normal traveling, or restarting the engine of the vehicle in a stopped state, the synchronization of the rotations of respective engaging portions of the clutch before the complete explosion of the engine, as in the case of returning from deceleration S&S traveling, is less likely to occur.

An object of the present invention is to improve disadvantages of the conventional example, and to provide a control device for a vehicle capable of suppressing the occurrence of shock at the time of returning from deceleration S&S traveling.

Solution to Problem

To achieve the above-described object, a control device for a vehicle according to the present invention includes: a coasting control unit configured to, during normal traveling at a low speed within a predetermined range, cause a vehicle to travel through inertia by blocking power transmission between an engine and driving wheels by disengaging a power transmitting/blocking device that includes a first engaging portion connected to the engine and a second engaging portion connected to the driving wheels, and by stopping the engine; and a return control unit configured not to full-engage the power transmitting/blocking device while the engine is cranking by a motor in a case of returning from coasting traveling to normal traveling and to full-engage the power transmitting/blocking device after the motor stops.

In the case of returning from coasting traveling to normal traveling, it is preferable that the return control unit does not full-engage the power transmitting/blocking device when a starter motor of the engine is in drive, even if a full-engaging condition of the power transmitting/blocking device has been satisfied, but full-engages the power transmitting/blocking device after the starter motor stops.

Moreover, it is preferable that, in a case where a rotation motor which generates at least first driving force for causing a vehicle to travel and second driving force for raising the rotation speed of the engine in a stopped state is provided between the engine and the power transmitting/blocking device, the return control unit, when returning from coasting traveling to normal traveling, does not full-engage the power transmitting/blocking device when the second driving force of the rotation motor is being output, even if the full-engaging condition of the power transmitting/blocking device has been satisfied, but full-engages the power transmitting/blocking device after the output of the second driving force by the rotation motor stops.

Advantageous Effects of Invention

A control device for a vehicle according to the present invention can avoid, by a return control unit, the complete explosion of an engine at the time a power transmitting/blocking device is in a full-engaged state. Therefore, the occurrence of shock of the vehicle caused by the torque of the engine due to such complete explosion can be suppressed, and also the uncomfortable feeling given to the driver by acceleration and deceleration of the vehicle can be suppressed.

DESCRIPTION OF EMBODIMENTS

An embodiment of a control device for a vehicle according to the present invention will be hereinafter described in detail with reference to the drawings. Meanwhile, the invention is not limited by the embodiment.

Embodiment

The embodiment of the control device for a vehicle according to the present invention will be described with reference to FIGS. 1 to 4.

First, an example of a vehicle to which such control device is applied will be described.

Figure 1:
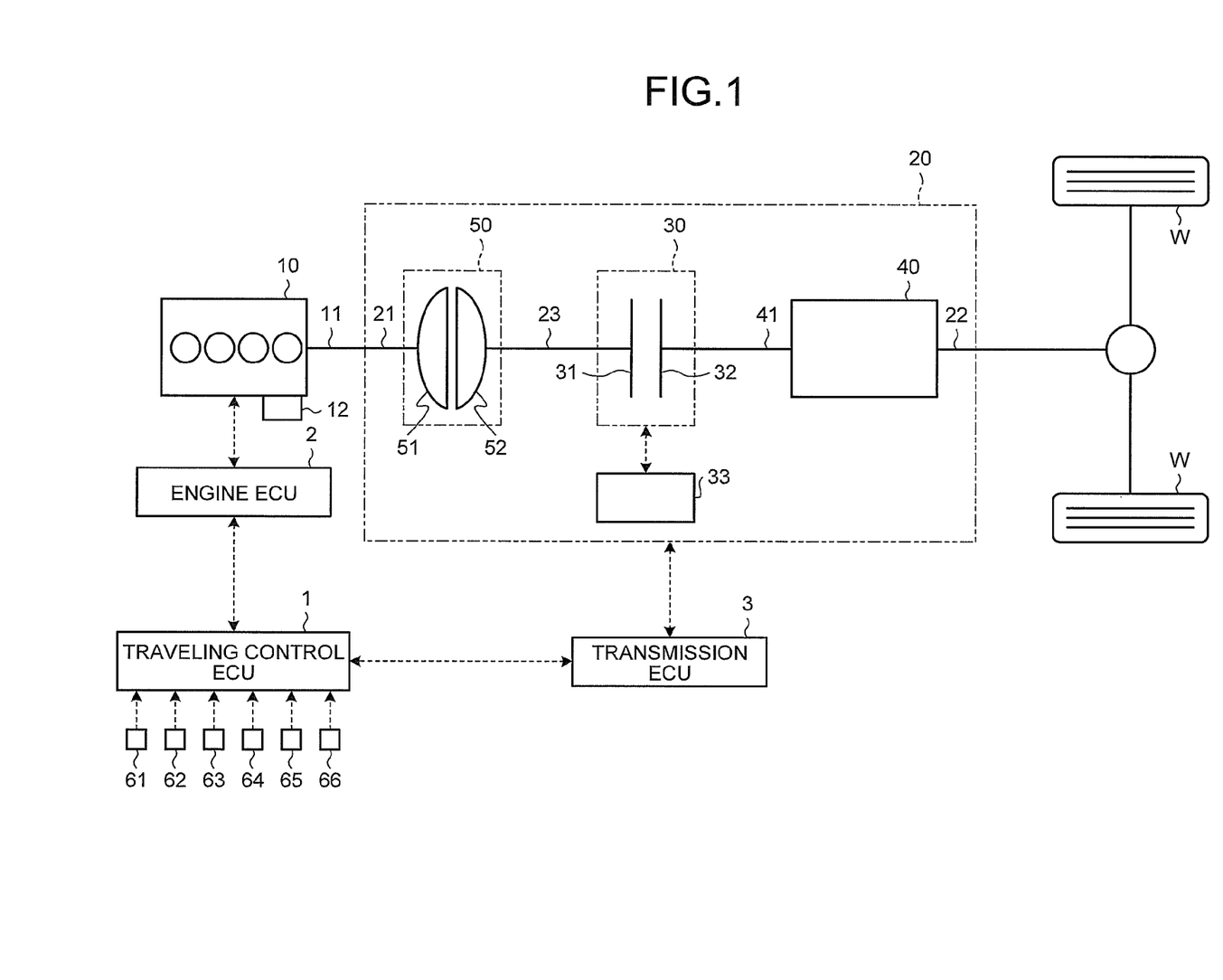
FIG. 1 is a diagram illustrating a control device for a vehicle and the vehicle according to an embodiment.

An exemplary vehicle, as illustrated in FIG. 1, is provided with an engine 10 as a power source, and an automatic transmission 20 that transmits the power from the engine 10 to driving wheels W. In addition, the vehicle is provided with a power transmitting/blocking device between the engine 10 and the driving wheels W, and during traveling, the power transmission therebetween is blocked by controlling the power transmitting/blocking device.

Furthermore, the vehicle is provided with, as the control device, an electronic control device 1 that performs control related to the traveling of the vehicle (hereinafter referred to as a "traveling control ECU" 1), an electronic control device 2 that controls the engine 10 (hereinafter referred to as an "engine ECU" 2), and an electronic control device 3 that controls the automatic transmission 20 (hereinafter referred to as a "transmission ECU" 3). The traveling control ECU 1 transmits and receives detection information from a sensor, an arithmetic processing result, and the like to/from the engine ECU 2 and the transmission ECU 3. Additionally, the traveling control ECU 1 sends commands to the engine ECU 2 and the transmission ECU 3. Then, the traveling control ECU 1 causes the engine ECU 2 to control the engine 10 in accordance with such command, and the transmission ECU 3 to control the automatic transmission 20 in accordance with such command.

The engine 10 is, for example, an internal combustion engine, and generates the power at an engine rotation shaft 11 by the supplied fuel.

The power transmitting/blocking device is disposed between the engine 10 and the driving wheels W (that is, on the transmission path of the power output by the engine 10). The power transmitting/blocking device can transmit the power between the engine 10 and the driving wheels W, but can also block the power transmission therebetween. In the exemplary vehicle, such power transmitting/blocking device is provided on the automatic transmission 20.

For example, not only general multi-mode automatic transmission and continuously variable automatic transmission, but also a dual clutch transmission (DCT), and a multi-mode manual transmission (MMT) capable of automatic gear shifting are included in the object applied as the automatic transmission 20 equipped in the vehicle. In the present embodiment, a multi-mode automatic transmission and a continuously variable automatic transmission will be described as examples.

The automatic transmission 20 of the present embodiment is provided with a clutch 30, a transmission main body 40, and a torque converter 50. The clutch 30 acts as the power transmitting/blocking device described above. The transmission main body 40 serves as an automatic transmission unit. The torque converter 50 transmits the power of the engine 10 to the transmission main body 40.

In the automatic transmission 20, a transmission input shaft 21 is coupled to an engine rotation shaft 11, and a transmission output shaft 22 is coupled to the driving wheels W. The transmission input shaft 21 is connected to a pump impeller 51 in the torque converter 50 to be integrally rotatable therewith. A turbine runner 52 of the torque converter 50 is connected to an intermediate shaft 23 to be integrally rotatable therewith. Furthermore, the intermediate shaft 23 is connected to a first engaging portion 31 of the clutch 30 to be integrally rotatable therewith. A second engaging portion 32 of the clutch 30 is connected to an input shaft 41 of the transmission main body 40 to be integrally rotatable therewith. The transmission main body 40 is also connected to the transmission output shaft 22. That is, in the vehicle, when the power transmission path is viewed from the side of the engine 10, the engine 10, the torque converter 50, the clutch 30, the transmission main body 40, and the driving wheels W are disposed in this order. The torque converter 50 is also provided with a lock-up clutch (not illustrated).

In the case of a multi-mode automatic transmission, the transmission main body 40 is provided with a plurality of engaging devices (clutch and brake) and a plurality of gears (not illustrated). The gear change stage (gear change ratio) is switched depending on the combination of an engaged state and a disengaged state of the engaging devices. A shift control unit of the transmission ECU 3 performs shift control by controlling the state of the engaging device. In the case of a continuously variable automatic transmission, for example, a belt type continuously variable transmission is used as the transmission main body 40.

The clutch 30 includes the first engaging portion 31 and the second engaging portion 32 connected to the engine 10 and the driving wheels W, respectively, on the power transmission path. The clutch 30 is a friction clutch in which a friction material is provided on the first engaging portion 31 and/or the second engaging portion 32. The clutch 30 becomes engaged when a working oil is supplied to the first engaging portion 31 and/or the second engaging portion 32 and the first engaging portion 31 and the second engaging portion 32 come in contact with each other. In such engaged state (half-engaged state and full-engaged state described later), the power can be transmitted between the engine 10 and the driving wheels W. On the other hand, the clutch 30 becomes disengaged when the supplied working oil is discharged and the first engaging portion 31 and the second engaging portion 32 are separated. In such disengaged state, the power transmission between the engine 10 and the driving wheels W is blocked.

The clutch 30 causes an actuator 33 to execute the engaging operation or the disengaging operation between the first engaging portion 31 and the second engaging portion 32. The actuator 33 is provided with, for example, an electromagnetic valve (not illustrated) that operates by a command from a clutch control unit of the transmission ECU 3. The actuator 33 adjusts the hydraulic pressure of the working oil supplied to the clutch 30 by the opening/closing operation of the electromagnetic valve.

The clutch 30 becomes engaged by opening the electromagnetic valve and increasing the hydraulic pressure of the supplied oil. Here, the clutch control unit, by adjusting the valve opening degree of the electromagnetic valve, adjusts the hydraulic pressure of the oil supplied to the clutch 30 (increased pressure amount), and creates a half-engaged state and a full-engaged state as different states. The half-engaged state is an engaged state that allows slipping between the first engaging portion 31 and the second engaging portion 32. The full-engaged state is an engaged state that does not allow slipping between the first engaging portion 31 and the second engaging portion 32, and even if the torque is input to the first engaging portion 31 and/or the second engaging portion 32, they rotate integrally with each other. The clutch control unit half-engages the clutch 30 by increasing the hydraulic pressure of the supplied oil up to a pressure within a predetermined range. The clutch control unit full-engages the clutch 30 by further increasing the hydraulic pressure of the supplied oil up to a pressure more than the maximum pressure of the predetermined range. Additionally, the clutch 30 becomes disengaged by closing the electromagnetic valve and decreasing the hydraulic pressure of the supplied oil.

Next, the arithmetic processing by the control device will be described.

The vehicle of the present embodiment can travel through inertia (coasting traveling) by blocking the power transmission between the engine 10 and the driving wheels W. Therefore, the traveling control ECU 1 includes a coasting control unit that performs control related to coasting traveling (hereinafter referred to as a "coasting control"). The coasting control unit blocks, during traveling, the power transmission between the engine 10 and the driving wheels W by disengaging the clutch 30 during normal traveling. The normal traveling refers to a state of traveling by transmitting the power of the engine 10 to the driving wheels W. The traveling control ECU 1 includes a traveling mode switching unit that switches between a normal traveling mode and a coasting traveling mode.

The exemplary vehicle can execute deceleration S&S traveling as coasting traveling. The deceleration S&S traveling is traveling through inertia by blocking the power transmission between the engine 10 and the driving wheels W, and also by stopping the engine 10. The deceleration S&S traveling is executed in a state where the driver is operating the brake (accelerator-OFF & brake-ON), and when the vehicle is in deceleration traveling at a predetermined speed or less. A deceleration S&S control unit is provided as a coasting control unit in the traveling control ECU 1.

An accelerator operation amount sensor 61 and a brake operation amount sensor 62 are connected to the traveling control ECU 1. The accelerator operation amount sensor 61 detects the accelerator opening degree or the like by the driver. Therefore, it is possible to grasp an accelerator-OFF state (accelerator-OFF operation) or an accelerator-ON state (accelerator-ON operation) of the driver at the traveling control ECU 1. The brake operation amount sensor 62 detects the brake depression amount or the like by the driver. Therefore, it is possible to grasp a brake-OFF state (brake-OFF operation) and a brake-ON state (brake-ON operation) of the driver at the traveling control ECU 1. A detection signal of a stop lamp switch (not illustrated) interlocked with the brake operation by the driver may be used to grasp the brake-OFF state (brake-OFF operation) and the brake-ON state (brake-ON operation).

When the accelerator-OFF state (accelerator-OFF operation) and the brake-ON state (brake-ON operation) of the driver during normal traveling at a predetermined vehicle speed or less are detected, the traveling mode switching unit can select a deceleration S&S mode as the coasting traveling mode. In such selection, a slope of a traveling road of the vehicle may be taken into consideration. The vehicle speed is detected by a vehicle speed sensor 63. The slope of a traveling road of the vehicle is detected by a slope sensor 64. A longitudinal acceleration sensor that detects longitudinal vehicle acceleration should be used as the slope sensor 64. The vehicle speed sensor 63 and the slope sensor 64 are connected to the traveling control ECU 1.

When the deceleration S&S mode is selected, the deceleration S&S control unit sends commands to the engine ECU 2 and the transmission ECU 3, and instructs the engine 10 to be stopped and the clutch 30 to be disengaged. Therefore, the vehicle, which is in a state where the brake operation is performed in a predetermined vehicle speed range, begins deceleration S&S traveling by stopping the engine 10 and blocking the power transmission between the engine 10 and the driving wheels W.

Figure 2:
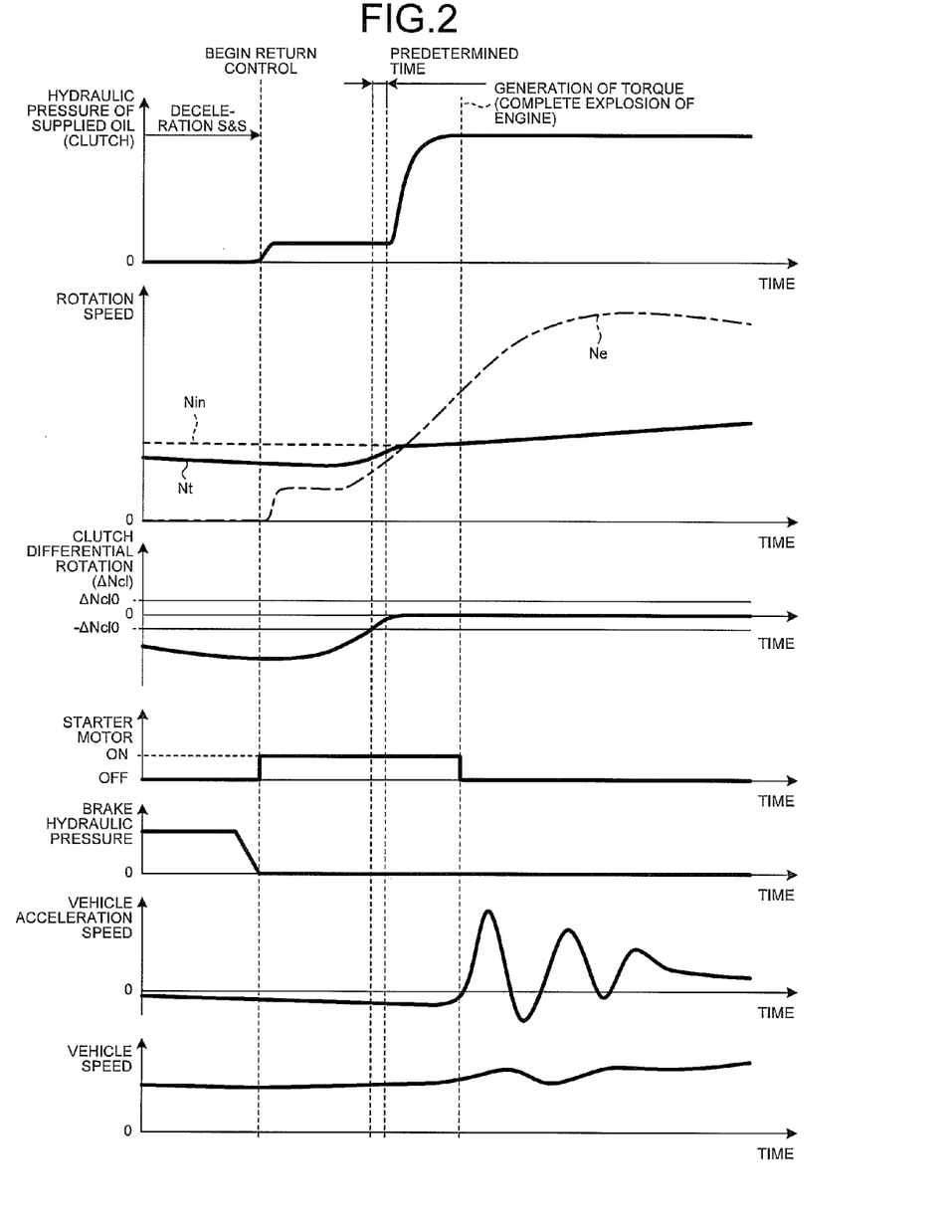
FIG. 2 is a conventional time chart of when returning from deceleration S&S traveling to normal traveling.
Figure 3:
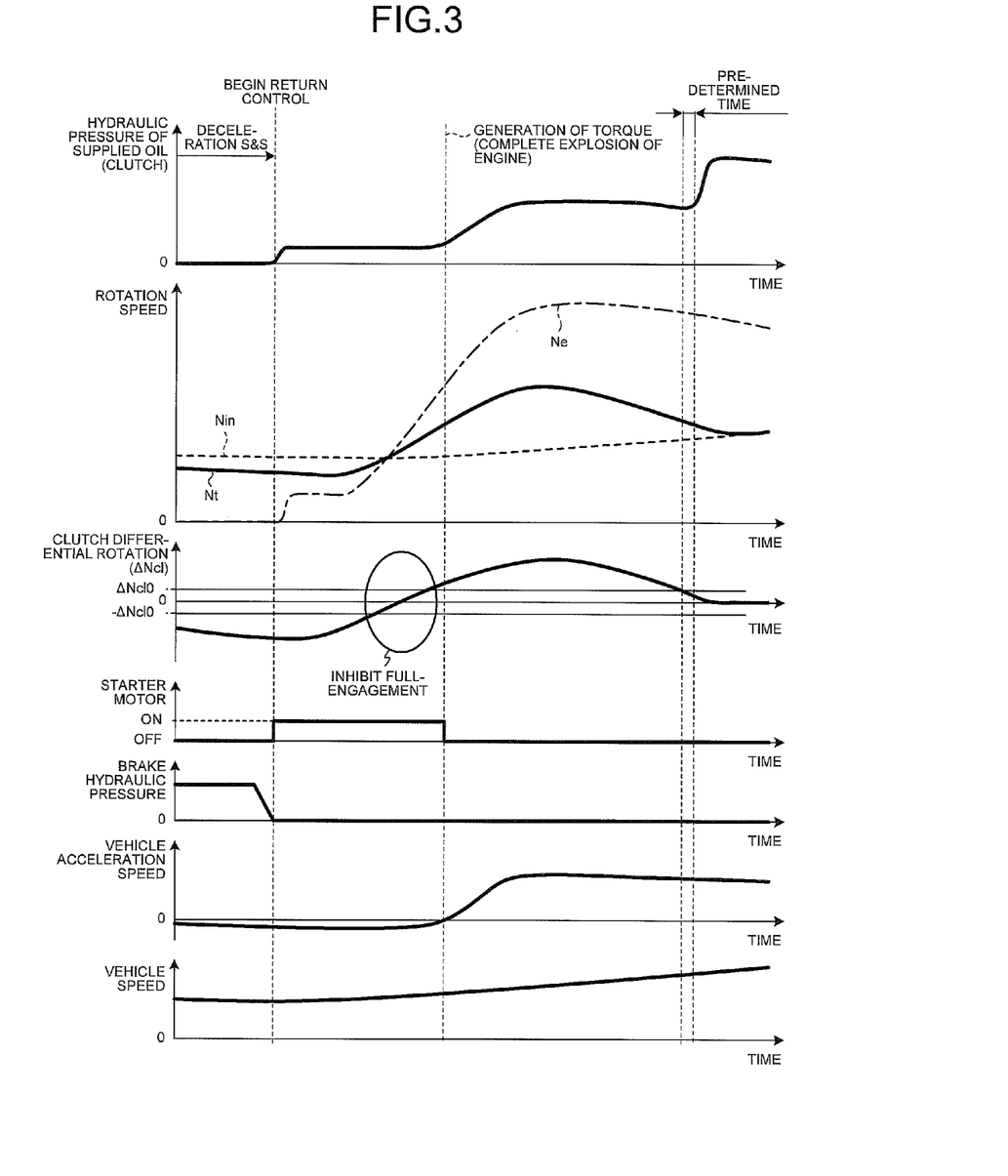
FIG. 3 is a time chart of when returning from deceleration S&S traveling to normal traveling according to the embodiment.

During the deceleration S&S traveling, there is a difference between the rotation speed of the turbine runner 52 (hereinafter referred to as "turbine rotation speed") Nt and the rotation speed of the input shaft 41 of the transmission main body 40 (hereinafter referred to as "input rotation speed") Nin. That is, there is a difference between the rotation speed of the first engaging portion 31 of the clutch 30 and the rotation speed of the second engaging portion 32 of the clutch 30. For example, during deceleration S&S traveling, the input rotation speed Nin (=rotation speed of the second engaging portion 32) is higher than the turbine rotation speed Nt (=rotation speed of the first engaging portion 31) (FIGS. 2 and 3). FIG. 2 is a time chart illustrating the conventional control to return from deceleration S&S traveling. FIG. 3 is a time chart illustrating the control to return from deceleration S&S traveling according to the present embodiment. During deceleration S&S traveling, the engine 10 is stopped; therefore, the turbine rotation speed Nt (=rotation speed of the first-engaging portion 31) corresponds to the speed ratio of the torque converter 50.

When the condition of returning to normal traveling has been satisfied during deceleration S&S traveling, the traveling mode switching unit selects the normal traveling mode. The case where the returning condition has been satisfied is, for example, when the brake-OFF state (brake-OFF operation) of the driver has been detected, or when the accelerator-ON state (accelerator-ON operation) of the driver has been detected. When the normal traveling mode is selected, the return control unit of the traveling control ECU 1 sends commands to the engine ECU 2 and the transmission ECU 3, and returns the vehicle from deceleration S&S traveling to normal traveling. In the return control, the engine 10 in a stopped state is restarted, and the clutch 30 in a disengaged state is engaged.

Together with the beginning of return control, the engine ECU 2 drives a starter motor 12 and begins the start control of the engine 10. Moreover, the engine ECU 2 ends the start control of the engine 10 by stopping the starter motor 12 when the engine 10 has completely exploded. The clutch control unit of the transmission ECU 3 full-engages the clutch 30 when the turbine rotation speed Nt (=rotation speed of the first engaging portion 31) and the input rotation speed Nin (=rotation speed of the second engaging portion 32) have been synchronized or regarded as being synchronized.

The turbine rotation speed Nt (=rotation speed of the first engaging portion 31) can be estimated from the engine rotation speed Ne and the speed ratio of the torque converter 50 using a detection signal from a crank angle sensor 65 of the engine 10. In order to detect the turbine rotation speed Nt (=rotation speed of the first engaging portion 31), a rotation sensor (not illustrated) that detects a rotation angle of the turbine runner 52 or the first engaging portion 31 may be provided. The input rotation speed Nin (=rotation speed of the second engaging portion 32) can be estimated from the rotation speed of the transmission output shaft 22 and the gear change ratio of the transmission main body 40 using a detection signal from a rotation sensor 66 that detects a rotation angle of the transmission output shaft 22. In order to detect the input rotation speed Nin (=rotation speed of the second engaging portion 32), a rotation sensor (not illustrated) that detects a rotation angle of the input shaft 41 or the second engaging portion 32 may be provided.

The case where the turbine rotation speed Nt (=rotation speed of the first engaging portion 31) and the input rotation speed Nin (=rotation speed of the second engaging portion 32) are regarded as being synchronized is when a differential rotation $\Delta$Ncl between the turbine rotation speed Nt and the input rotation speed Nin, that is, the differential rotation $\Delta$Ncl between the first engaging portion 31 and the second engaging portion 32 of the clutch 30 (hereinafter referred to as a "clutch differential rotation" $\Delta$Ncl), is reduced to a differential rotation within the predetermined range ($-\Delta$Ncl0$\leq\Delta$Ncl$\leq\Delta$Ncl0) and when such state continues for a predetermined time.

The state in which the clutch differential rotation $\Delta$Ncl is within the predetermined range of the differential rotation is a state in which the full-engaging operation of the clutch 30, in which the shock is reduced to a predetermined magnitude or less, is possible. The predetermined magnitude is a magnitude of the shock that the occupant cannot feel even if the shock occurring on the clutch 30 is transmitted to the driving wheels W and the vehicle body. In addition, the predetermined time is, for example, a time for excluding operational errors of the clutch differential rotation $\Delta$Ncl due to the torque fluctuation or the like in the power transmission path. As a result, when the state in which the clutch differential rotation $\Delta$Ncl is within a predetermined range of the differential rotation is continued for the predetermined time, the return control unit determines that the full-engaging control of the clutch 30 is possible, and the clutch 30 is full-engaged by the clutch control unit.

In return control, the rotation of the engine 10 is raised by the driving force of the starter motor 12; therefore, in response, the turbine rotation speed Nt (=rotation speed of the first engaging portion 31) gets close to, while increasing, the input rotation speed Nin (=rotation speed of the second engaging portion 32). Thereafter, in the clutch 30, the first engaging portion 31 and the second engaging portion 32 are synchronized or regarded as being synchronized. However, there is a case where the engine 10 has not yet completed the start control and has not completely exploded when the clutch 30 is in such synchronous state or the like. Therefore, as illustrated in FIG. 2, when the clutch 30 is full-engaged during the start control of the engine 10, the engine 10 completely explodes when the clutch 30 is in a full-engaged state. As a result, there is a possibility that the torque, due to the complete explosion, is transmitted to the full-engaged clutch 30. Therefore, in the vehicle, there is a possibility that the shock occurs due to the torque transmitted through the power transmission path.

Accordingly, in the case of returning from deceleration S&S traveling to normal traveling, the return control unit of the present embodiment inhibits the full-engagement of the clutch 30 until the start control of the engine 10 is completed, even if the clutch 30 has been synchronized or regarded as being synchronized. The return control unit allows the clutch 30 to full-engage after the start control of the engine 10 has been completed and if the clutch 30 has been synchronized or regarded as being synchronized.

According to the present embodiment, the complete explosion of the engine 10 is when the start control of the engine 10 is completed. In summary, in the case of returning from deceleration S&S traveling to normal traveling, the return control unit inhibits the full-engagement of the clutch 30 until the engine 10 is completely exploded, even if the clutch 30 has been synchronized or regarded as being synchronized. The return control unit full-engages the clutch 30 after the complete explosion of the engine 10 and if the clutch 30 has been synchronized or regarded as being synchronized.

When the engine ECU 2 detects the complete explosion of the engine 10, by stopping the starter motor 12, the engine ECU 2 ends the cranking of the engine 10 by the starter motor 12, and ends the start control of the engine 10. Therefore, in the case of returning from deceleration S&S traveling to normal traveling, the return control unit does not full-engage the clutch 30 when the engine 10 is cranking by the starter motor 12 which operates as a motor, but full-engages the clutch 30 after the cranking of the engine 10 ends (that is, after the starter motor 12, as a motor, stops). Specifically, in the case of returning from deceleration S&S traveling to normal traveling, the return control unit inhibits the full-engagement of the clutch 30 when the starter motor 12 is in drive, even if the clutch 30 has been synchronized or regarded as being synchronized. The return control unit full-engages the clutch 30 after the starter motor 12 has stopped and if the clutch 30 has been synchronized or regarded as being synchronized. In a flowchart of FIG. 4, the above case is described as an example.

Figure 4:
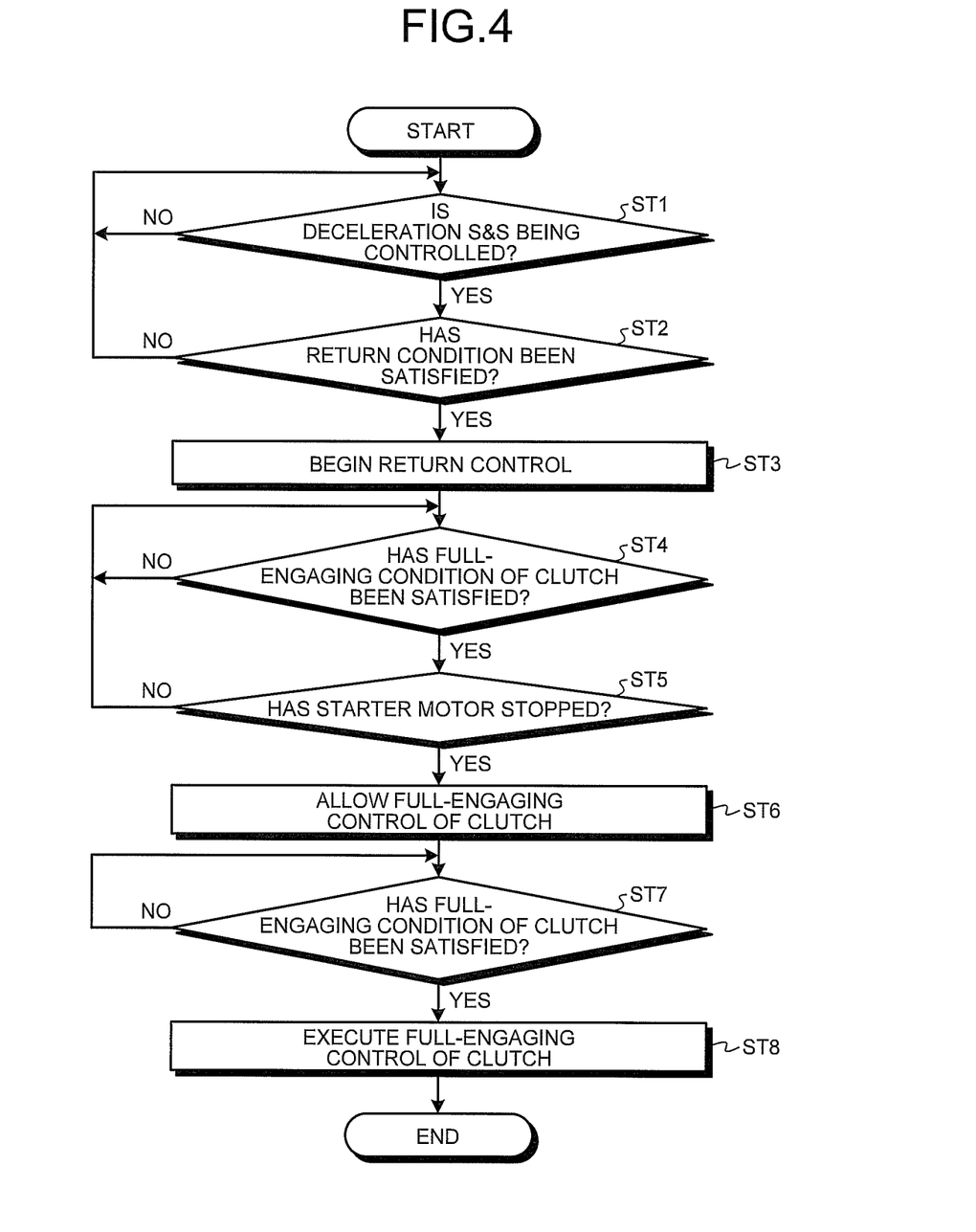
FIG. 4 is a flowchart of when returning from deceleration S&S traveling to normal traveling according to the embodiment.

The return control unit determines whether the deceleration S&S is being controlled (step ST1). When the deceleration S&S is not being controlled, the return control unit repeats the arithmetic processing.

On the other hand, when the deceleration S&S is being controlled, the return control unit determines whether the condition of returning from the deceleration S&S traveling to the normal traveling has been satisfied (step ST2). When the returning condition has not been satisfied, the return control unit returns to step ST1.

On the other hand, when the returning condition has been satisfied, the return control unit begins the control to return from deceleration S&S traveling to normal traveling (step ST3). For example, the return control unit sends commands to the engine ECU 2 and the transmission ECU 3. Then, the return control unit restarts the engine 10 in a stopped state by the starter motor 12 and, in order to increase the responsiveness of the engaging control, increases the hydraulic pressure of the oil supplied to the clutch 30 up to a pressure within a range in which a disengaged state is maintained (FIG. 3).

Due to the beginning of the return control, in the vehicle, the turbine rotation speed Nt (=rotation speed of the first engaging portion 31) gets close to the input rotation speed Nin (=rotation speed of the second engaging portion 32). Therefore, the return control unit calculates a clutch differential rotation ΔNcl based on the turbine rotation speed Nt (=rotation speed of the first engaging portion 31) and the input rotation speed Nin (=rotation speed of the second engaging portion 32). Then, the return control unit determines whether the full-engaging condition of the clutch 30 has been satisfied based on the clutch differential rotation ΔNcl (step ST4). When the turbine rotation speed Nt (=rotation speed of the first engaging portion 31) and the input rotation speed Nin (=rotation speed of the second engaging portion 32) have been synchronized or regarded as being synchronized, the return control unit determines that the full-engaging condition of the clutch 30 has been satisfied.

When the full-engaging condition of the clutch 30 has not been satisfied, the return control unit repeats the arithmetic processing in step ST4. On the other hand, when the full-engaging condition of the clutch 30 has been satisfied, the return control unit determines whether the starter motor 12 has stopped (step ST5).

When the starter motor 12 is still being driven, the start control of the engine 10 has not yet been completed; therefore, the return control unit returns to step ST4.

On the other hand, when the starter motor 12 has stopped, the start control of the engine 10 has been completed; therefore, the return control unit allows the full-engaging control of the clutch 30 (step ST6). Then, the return control unit determines whether the full-engaging condition of the clutch 30 has been satisfied (step ST7). In order to suppress the occurrence of shock when the clutch 30 is full-engaged, the return control unit, after allowing the full-engaging control of the clutch 30, desirably increases the hydraulic pressure of the supplied oil, as illustrated in FIG. 3, by sending a command to the transmission ECU 3, and half-engages the clutch 30.

When the full-engaging condition of the clutch 30 has not been satisfied, the return control unit repeats the arithmetic processing in step ST7. On the other hand, when the full-engaging condition of the clutch 30 has been satisfied, the return control unit full-engages the clutch 30 by sending a command to the transmission ECU 3 (step ST8).

As described above, in the case of returning from deceleration S&S traveling to normal traveling, the control device inhibits the full-engagement of the clutch 30 until the start control of the engine 10 is completed, and full-engages the clutch 30 after such start control has been completed. The control device can avoid the complete explosion of the engine 10 at the time the clutch 30 is in a full-engaged state. Therefore, the occurrence of the shock of the vehicle caused by the torque of the engine 10 due to such complete explosion can be suppressed, and also the uncomfortable feeling given to the driver by acceleration and deceleration of the vehicle can be suppressed. The control device does not even half-engage the clutch 30 when the engine 10 is completely exploded, and the slipping does not occur in the clutch 30 by the torque of the engine 10 due to such complete explosion. Therefore, deterioration of the durability of the clutch 30 can be suppressed.

[Modification]

Figure 5:
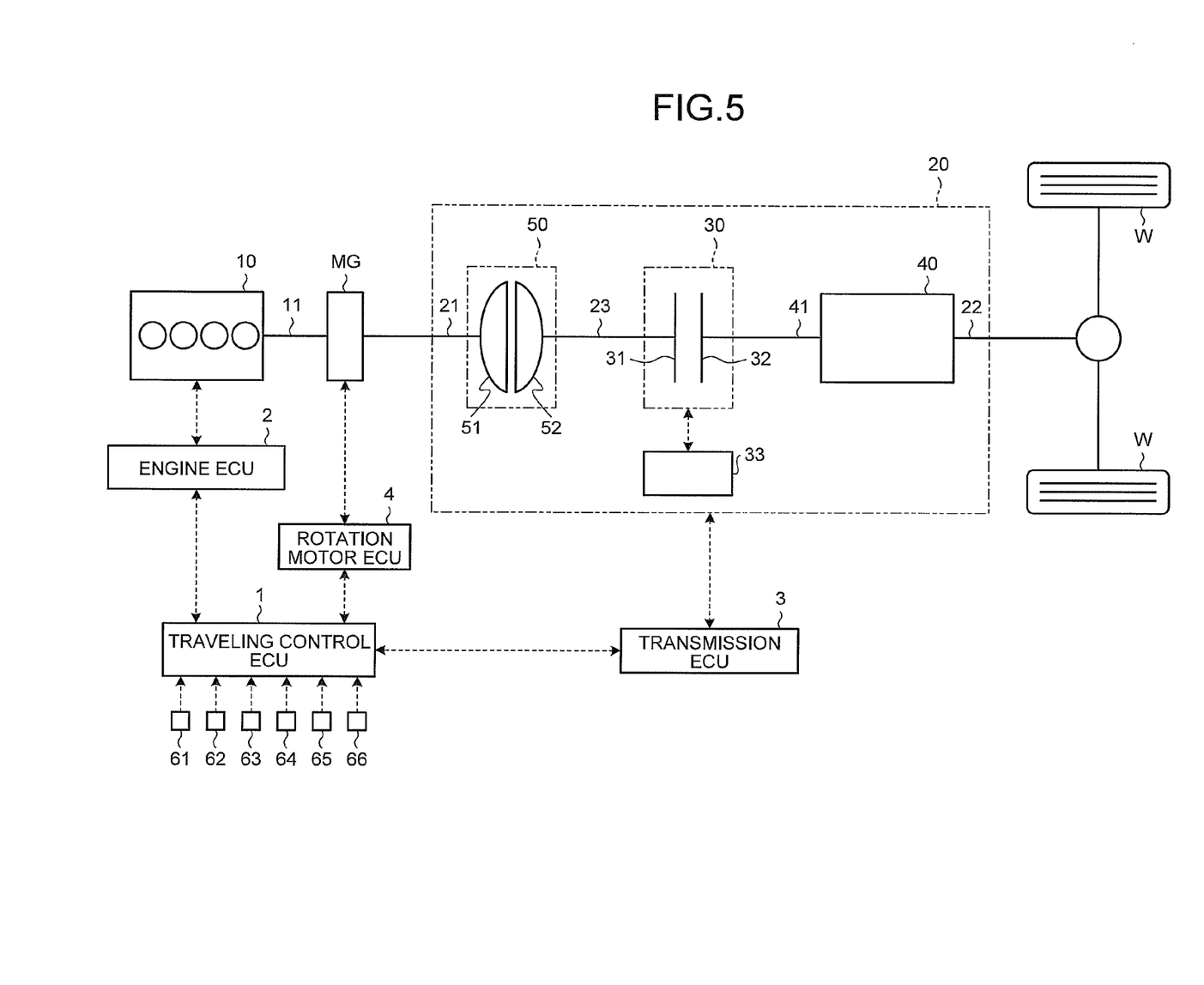
FIG. 5 is a diagram illustrating a control device for a vehicle and the vehicle according to a modification.

The control by the control device of the embodiment described above may also be applied to a vehicle described below. FIG. 5 is a diagram illustrating such vehicle. Among the signs illustrated in FIG. 5, the signs same as those in the embodiment represent the components, devices, and the like same as those in the embodiment. Therefore, hereinafter, the description of the signs same as those in the embodiment is omitted.

A vehicle of the present modification is a hybrid vehicle in which a rotation motor MG is provided between an engine 10 and a clutch 30 in a vehicle of the embodiment. Specifically, the rotation motor MG is provided between the engine 10 and the torque converter 50 in the exemplary vehicle. An electronic control device 4 that controls the rotation motor MG (hereinafter referred to as a "rotation motor ECU" 4) is provided as a control device in the vehicle. The rotation motor ECU 4 transmits and receives detection information of a sensor, an arithmetic processing result, and the like to/from a traveling control ECU 1. The traveling control ECU 1 sends a command to the rotation motor ECU 4 and then, causes the rotation motor ECU 4 to control the rotation motor MG in accordance with such command. The vehicle is described without a starter motor 12 being provided; however, the vehicle may be provided with the starter motor 12.

At least first driving force for causing the vehicle to travel and second driving force for raising the rotation speed of the engine 10 in a stopped state are generated in the rotation motor MG. The exemplary rotation motor MG is a motor generator that has a function as a motor at the time of power running driving and a function as a generator at the time of regeneration driving.

For example, in the case of causing a vehicle to travel using the power of both the engine 10 and the rotation motor MG, the traveling control ECU 1 sends commands to the engine ECU 2, the transmission ECU 3, and the rotation motor ECU 4. Then, the traveling control ECU 1 causes the engine 10 and the rotation motor MG to output the driving force of the engine and the driving force of the rotation motor (first driving force), respectively, in accordance with the required driving force. Also, the traveling control ECU 1 full-engages the clutch 30. In the case of executing coasting traveling (deceleration S&S traveling), the traveling control ECU 1 sends commands to the engine ECU 2, the transmission ECU 3, and the rotation motor ECU 4. Then, the traveling control ECU 1 stops the engine 10 and the rotation motor MG, and disengages the clutch 30.

In the case of starting the engine 10, the traveling control ECU 1 sends commands to the engine ECU 2, the transmission ECU 3, and the rotation motor ECU 4, and drives the rotation motor MG while keeping the clutch 30 disengaged. Then, in order to begin the start control of the engine 10, the traveling control ECU 1 raises the rotation speed of the engine 10 by the driving force of the rotation motor MG (second driving force) which operates as a motor. When the traveling control ECU 1 detects the complete explosion of the engine 10, by stopping the output of the second driving force by the rotation motor MG which operates as a motor, the traveling control ECU 1 ends the cranking of the engine 10 by the rotation motor MG, and ends the start control of the engine 10. In the case of returning from deceleration S&S traveling to normal traveling, same as in the embodiment, the return control unit does not full-engage the clutch 30 when the engine 10 is cranking by the second driving force by the rotation motor MG which operates as a motor, but full-engages the clutch 30 after the cranking of the engine 10 ends (that is, after stopping the rotation motor MG by stopping the output of the second driving force by the rotation motor MG which operates as a motor). Specifically, in the case of returning from deceleration S&S traveling to normal traveling, the return control unit inhibits the full-engagement of the clutch 30 when the rotation motor MG is outputting the second driving force, even if the clutch 30 has been synchronized or regarded as being synchronized. The return control unit full-engages the clutch 30 after the output of the second driving force by the rotation motor MG has stopped and if the clutch 30 has been synchronized or regarded as being synchronized. In a flowchart of FIG. 6, the above case is described as an example.

Figure 6:
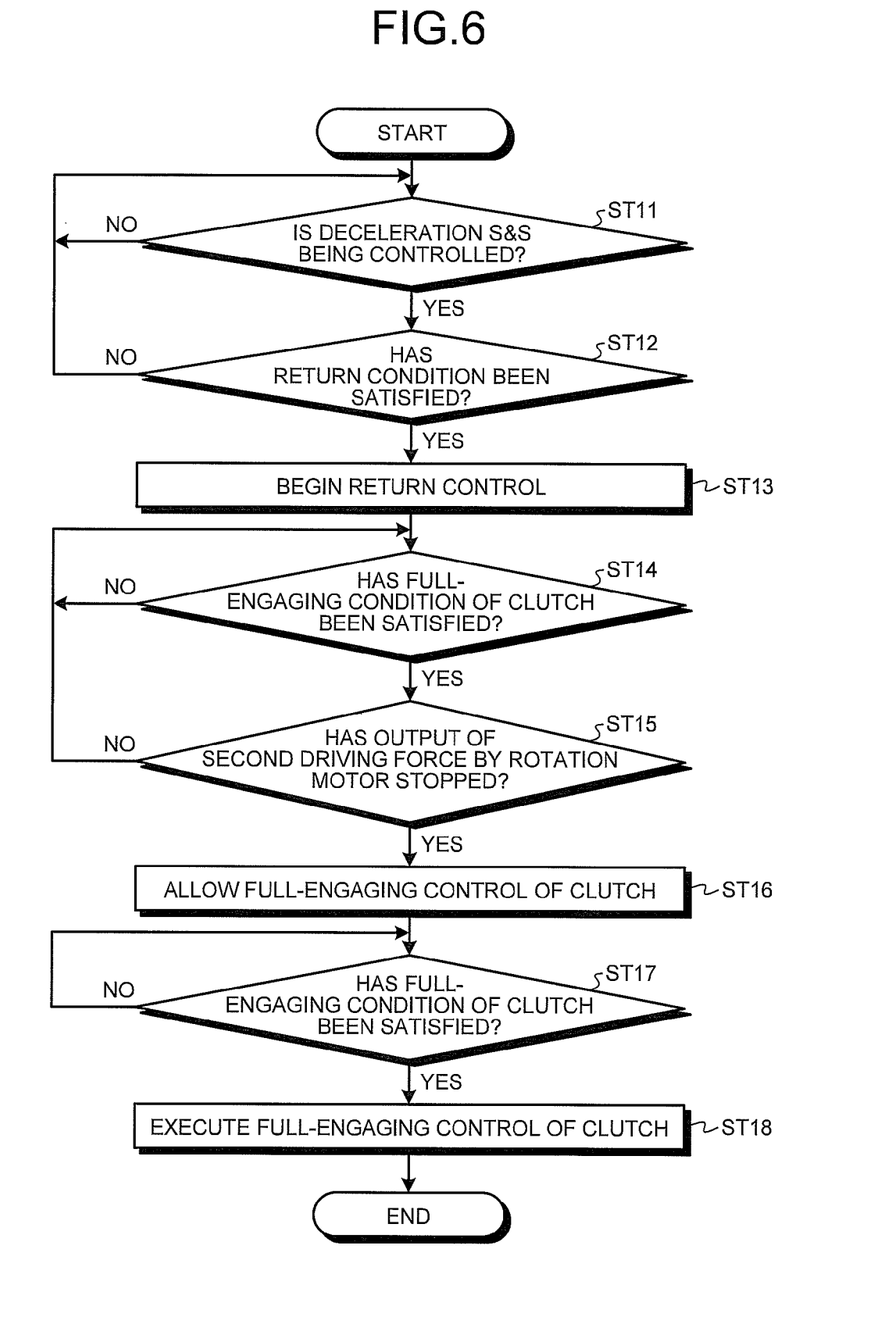
FIG. 6 is a flowchart of when returning from deceleration S&S traveling to normal traveling according to the modification.
Figure 7:
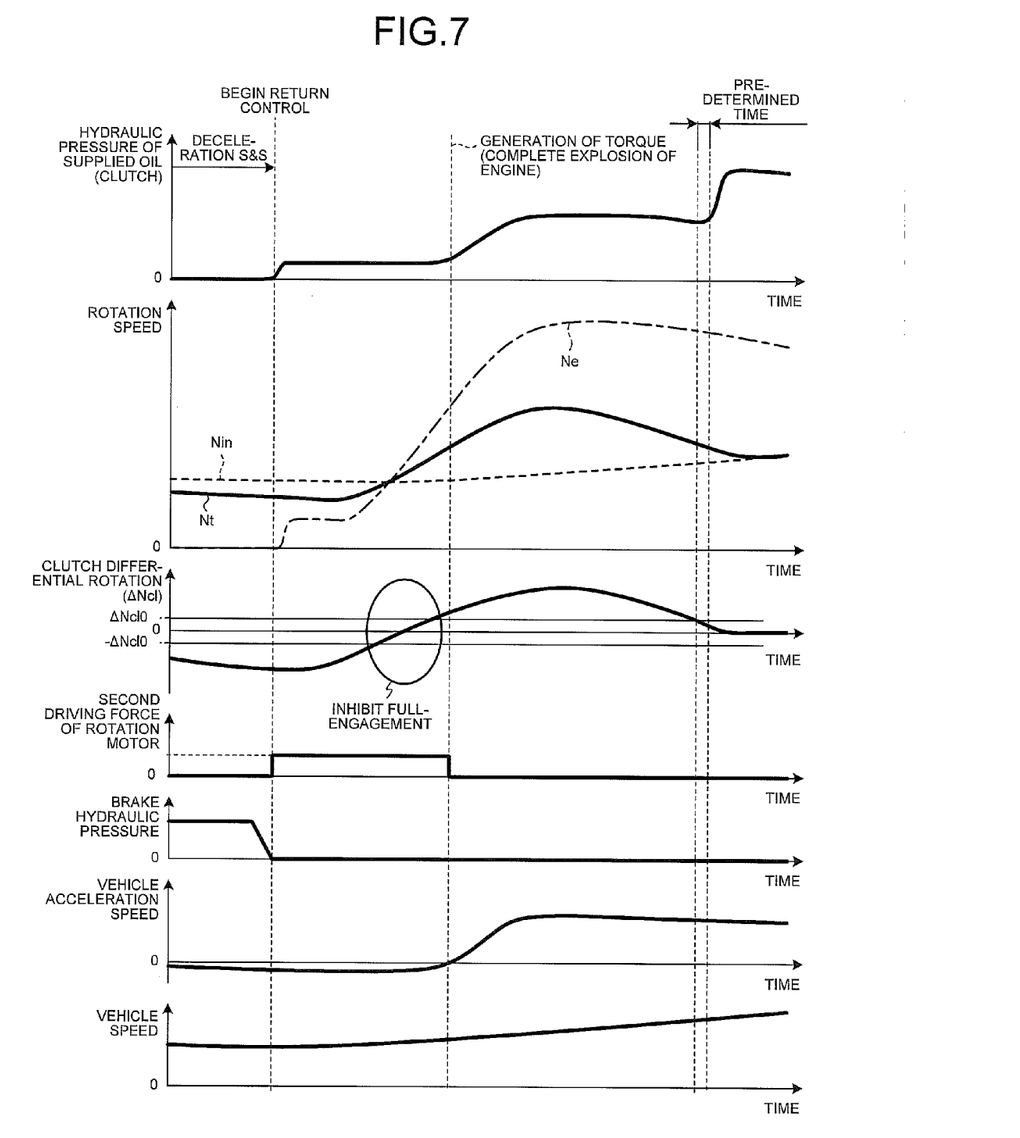
FIG. 7 is a time chart of when returning from deceleration S&S traveling to normal traveling according to the modification.

The return control unit determines the same way as in steps ST1 and ST2 of the embodiment (steps ST11 and ST12), and begins the control to return from deceleration S&S traveling to normal traveling (step ST13). For example, the return control unit, in such return control, sends commands to the engine ECU 2, the transmission ECU 3, and the rotation motor ECU 4. Then, the return control unit restarts the engine 10 in a stopped state by the second driving force of the rotation motor MG and, in order to increase the responsiveness of the engaging control, increases the hydraulic pressure of the oil supplied to the clutch 30 up to a pressure within a range in which a disengaged state is maintained (FIG. 7).

Due to the beginning of the return control, in the vehicle, the turbine rotation speed Nt (=rotation speed of the first engaging portion 31) gets close to the input rotation speed Nin (=rotation speed of the second engaging portion 32). Therefore, in the same way as in step ST4, the return control unit determines whether the full-engaging condition of the clutch 30 has been satisfied (step ST14). The return control unit repeats the arithmetic processing of step ST14 until the full-engaging condition is satisfied.

When the full-engaging condition of the clutch 30 has been satisfied, the return control unit determines whether the output of the second driving force by the rotation motor MG has stopped (step ST15).

When the rotation motor MG is outputting the second driving force, the start control of the engine 10 has not yet been completed; therefore, the return control unit returns to step ST14.

On the other hand, when the output of the second driving force by the rotation motor MG has stopped, the start control of the engine 10 has been completed; therefore, the return control unit allows the full-engaging control of the clutch 30 (step ST16). Then, the return control unit determines whether the full-engaging condition of the clutch 30 has been satisfied (step ST17). In order to suppress the occurrence of shock when the clutch 30 is full-engaged, same as in the embodiment, the return control unit, after allowing the full-engaging control of the clutch 30, desirably increases the hydraulic pressure of the supplied oil, as illustrated in FIG. 7, by sending a command to the transmission ECU 3, and half-engages the clutch 30.

When the full-engaging condition of the clutch 30 has not been satisfied, the return control unit repeats the arithmetic processing in step ST17. On the other hand, when the full-engaging condition of the clutch 30 has been satisfied, the return control unit full-engages the clutch 30 by sending a command to the transmission ECU 3 (step ST18).

As described above, in the case of returning from deceleration S&S traveling to normal traveling, same as in the control device of the embodiment, the control device of the present modification inhibits the full-engagement of the clutch 30 until the start control of the engine 10 is completed, and full-engages the clutch 30 after such start control has been completed. Therefore, the control device of the present modification can obtain effects similar to those described in the embodiment.

REFERENCE SIGNS LIST

1 Traveling control ECU
2 Engine ECU
3 Transmission ECU
4 Rotation motor ECU
10 Engine
12 Starter motor
20 Automatic transmission
30 Clutch
31 First engaging portion
32 Second engaging portion
40 Transmission main body
50 Torque converter
52 Turbine runner
MG Rotation motor
W Driving wheel

The invention claimed is:

1. A control device for a vehicle, comprising:
a coasting control unit configured to, during normal traveling at a low speed within a predetermined range and when detecting brake release by a driver, cause a vehicle to travel through inertia by blocking power transmission between an engine and driving wheels by disengaging a power transmitting/blocking device that includes a first engaging portion connected to the engine and a second engaging portion connected to the driving wheels, and by stopping the engine; and
a return control unit configured not to full-engage the power transmitting/blocking device while the engine is cranking by a starter motor in a case of returning from coasting traveling to normal traveling and to full-engage the power transmitting/blocking device after the motor stops,
wherein the return control unit is configured to inhibit the power transmitting/blocking device from being fully-engaged at a timing when a state is changed from a rotation speed of the first engaging portion (Nt)<a rotation speed of the second engaging portion (Nin) to Nt=Nin in a case of returning from deceleration start and stop traveling to normal traveling.

2. The control device for a vehicle according to claim 1, wherein, in the case of returning from coasting traveling to normal traveling, the return control unit does not full-engage the power transmitting/blocking device when the starter motor of the engine is in drive, and fully-engages the power transmitting/blocking device after the starter motor stops.

3. The control device for a vehicle according to claim 1, wherein, in a case where the motor is a rotation motor which generates at least a first driving force for causing a vehicle to travel and a second driving force for raising the rotation speed of the engine in a stopped state that is provided between the engine and the power transmitting/blocking device, the return control unit, when returning from coasting traveling to normal traveling, does not fully-engage the power transmitting/blocking device when the second driving force of the rotation motor is being output.

4. The control device for a vehicle according to claim 1, wherein the return control unit is configured to inhibit the power transmitting/blocking device from being fully-engaged at the timing when the state is changed from Nt<Ni to Nt=Nin, and then configured to fully-engage the power transmitting/blocking device at a timing when a state is changed from Nt>Nin to Nt=Nin.

* * * * *

UNITED STATES PATENT AND TRADEMARK OFFICE
CERTIFICATE OF CORRECTION

PATENT NO.         : 9,981,663 B2
APPLICATION NO.    : 15/022070
DATED              : May 29, 2018
INVENTOR(S)        : Satoshi Yamanaka et al.

Page 1 of 1

It is certified that error appears in the above-identified patent and that said Letters Patent is hereby corrected as shown below:

Column 12, Lines 45-46 at Claim 1, change from "start and stop traveling" to "stop and start traveling"

Signed and Sealed this
Twentieth Day of November, 2018

Andrei Iancu
*Director of the United States Patent and Trademark Office*